United States Patent
Seo et al.

(10) Patent No.: US 9,432,207 B2
(45) Date of Patent: Aug. 30, 2016

(54) SYSTEM AND METHOD FOR TRANSFERRING MESSAGE IN ETHERNET BASED VEHICLE NETWORK

(71) Applicants: Hyundai Motor Company, Seoul (KR); Kia Motors Corporation, Seoul (KR); Research & Business Foundation Sungkyunkwan University, Suwon, Gyeonggi-do (KR)

(72) Inventors: Suk Hyun Seo, Gyeonggi-do (KR); Hyun Cheol Bae, Gyeonggi-do (KR); Chung Hi Lee, Seoul (KR); Jae Wook Jeon, Gyeonggi-do (KR); Jin Ho Kim, Gyeonggi-do (KR)

(73) Assignees: Hyundai Motor Company, Seoul (KR); Kia Motors Corporation, Seoul (KR); Research & Business Foundation Sungkyunkwan University, Suwon, Gyeonggi-do (KR)

( * ) Notice: Subject to any disclaimer, the term of this patent is extended or adjusted under 35 U.S.C. 154(b) by 274 days.

(21) Appl. No.: 14/073,221

(22) Filed: Nov. 6, 2013

(65) Prior Publication Data

US 2015/0003456 A1  Jan. 1, 2015

(30) Foreign Application Priority Data

Jul. 1, 2013 (KR) .................. 10-2013-0076306

(51) Int. Cl.
*H04L 12/28* (2006.01)
*H04L 12/46* (2006.01)
*H04L 12/66* (2006.01)
*H04L 29/06* (2006.01)
*H04L 12/40* (2006.01)

(52) U.S. Cl.
CPC ........... *H04L 12/28* (2013.01); *H04L 12/2836* (2013.01); *H04L 12/4625* (2013.01);*H04L12/66* (2013.01); *H04L 69/22* (2013.01); *H04L 2012/40215* (2013.01); *H04L 2012/40234* (2013.01); *H04L 2012/40241* (2013.01); *H04L 2012/40273* (2013.01)

(58) Field of Classification Search
CPC ............... H04L 12/28; H04L 12/2836; H04L 12/4625; H04L 12/4633; H04L 12/66; H04L 29/06027; H04L 69/22; H04L 2012/40215; H04L 2012/40234; H04L 2012/40241; H04L 2012/40273
See application file for complete search history.

(56) References Cited

U.S. PATENT DOCUMENTS

| | | | |
|---|---|---|---|
| 7,940,673 B2 | 5/2011 | Ballard et al. | |
| 2004/0233933 A1* | 11/2004 | Munguia | H04L 12/4633 370/473 |
| 2005/0068941 A1* | 3/2005 | Erhart | H04L 29/06027 370/352 |

FOREIGN PATENT DOCUMENTS

| KR | 10-2004-0045710 | 6/2004 |
|---|---|---|
| KR | 10-2005-0027090 | 3/2005 |

(Continued)

OTHER PUBLICATIONS

Nacer, A.A. et al., "Strategies for the Interconnection of CAN buses through an Ethernet switch", IRIT-ENSEEIHT, Toulouse University, France.

*Primary Examiner* — Khoa Huynh
(74) *Attorney, Agent, or Firm* — Mintz Levin Cohn Ferris Glovsky and Popeo, P.C.; Peter F. Corless (57) ABSTRACT

An Ethernet based vehicle network message transferring system is provided that includes a gateway switch that connects the Ethernet to vehicle networks having different protocols and an Ethernet switch that switches Ethernet messages between the gateway switch and vehicle devices to transfer the Ethernet messages. The Ethernet switch includes a processing module that transfers the Ethernet messages received via the gateway switch in the different vehicle networks, a vehicle network process module that switches the messages transferred from the processing module, and a lookup table in which information necessary for switching the vehicle network process module is stored. The vehicle network process module analyzes an Ethernet message transferred via the processing module in the gateway switch to identify destinations of individual messages in the Ethernet message and divides the Ethernet message including information regarding the individual message according to destinations to transmit the divided Ethernet messages to vehicle devices of destinations.

13 Claims, 9 Drawing Sheets

(56) References Cited

FOREIGN PATENT DOCUMENTS

| KR | 10-2006-0010834 | 2/2006 |
| KR | 10-2010-0015510 | 2/2010 |
| KR | 10-2011-0038197 | 4/2011 |
| KR | 10-1033793 | 5/2011 |
| KR | 10-2011-0057371 A | 6/2011 |
| KR | 10-2012-0107783 | 10/2012 |
| KR | 10-2013-0003902 | 1/2013 |

* cited by examiner

FIG. 1

RELATED ART

FIG. 2

RELATED ART

SYSTEM AND METHOD FOR TRANSFERRING MESSAGE IN ETHERNET BASED VEHICLE NETWORK

CROSS-REFERENCE TO RELATED APPLICATION

This application claims under 35 U.S.C. §119(a) the benefit of Korean Patent Application No. 10-2013-0076306, filed on Jul. 1, 2013, the entire contents of which are incorporated herein by reference.

BACKGROUND (a) Technical Field

The present invention relates to a vehicle network system and method. More particularly, the present invention relates to a system and a method which can reduce waste of bandwidths and generation of an overhead, occurring in a message transferring process in a vehicle network structure in which a vehicle network such as controller area network (CAN), local interconnect network (LIN), and FlexRay and the Ethernet are connected and can allow an efficient communication between vehicle devices.

(b) Background Art

In recent years, as electronic technologies and communication technologies related to vehicles are being rapidly developed, the number and types of electronic systems applied to vehicles are increasing. For example, various demands on electronic systems such as an information and multimedia reproduction system, an artificial intelligence system, a rear side detection system, an around view monitoring (AVM) system, a lane departure warning system (LDWS), a collision avoidance system (CAS), and a traffic sign recognition system, in addition to a control system related to engine control or exhaust gas control and a safety system such as an airbag system in vehicles are continuously increasing.

In the electronic system, information collection units such as imaging devices (e.g., cameras, video cameras, etc.), various sensors, and high level/low level controller are connected via a communication network, and accordingly, a network structure which reduces separate dedicated wires for various functions while supporting the functions to configure a more efficient electronic system is required. In addition, protocols for providing a high bandwidth and increased flexibility, and a deterministic operation to configure the network structure are required, and various protocols defining wiring structures and communication standards for high level systems are recently being applied to vehicles.

Controller area network (CAN), local internet network (LIN), and FlexRay are representative protocols, and protocols that show various advantages in vehicles are being developed. Further, integrated network systems that connect protocols of different vehicles through conversion of data between a plurality of protocols, for integrating and managing the protocols are being developed.

In recent years, technologies for using the Ethernet in vehicle systems such as communication systems, control systems, and image providing systems are being proposed. In addition, various devices such as sensors, imaging devices (e.g., cameras, video cameras, etc.), and laser scanners are being used, and as the number of vehicle devices gradually increases, it is expected that the existing vehicle networks (CAN, LIN, and FlexRay) may not support the required bandwidths. In particular, the Ethernet audio video bridging (hereinafter, referred to as 'AVB') technology may be applied to developing vehicles, and the Ethernet AVB technology corresponds to protocols for transmitting string data such as audios and videos. In the vehicle electronic system that uses the Ethernet employing the AVB, vehicle devices are connected to communicate with each other via one or more Ethernet links, and communications between electronic devices are performed on the Ethernet link using the AVB to transmit and receive various information such as multimedia, controls, diagnoses, and detection information.

Figure 1:
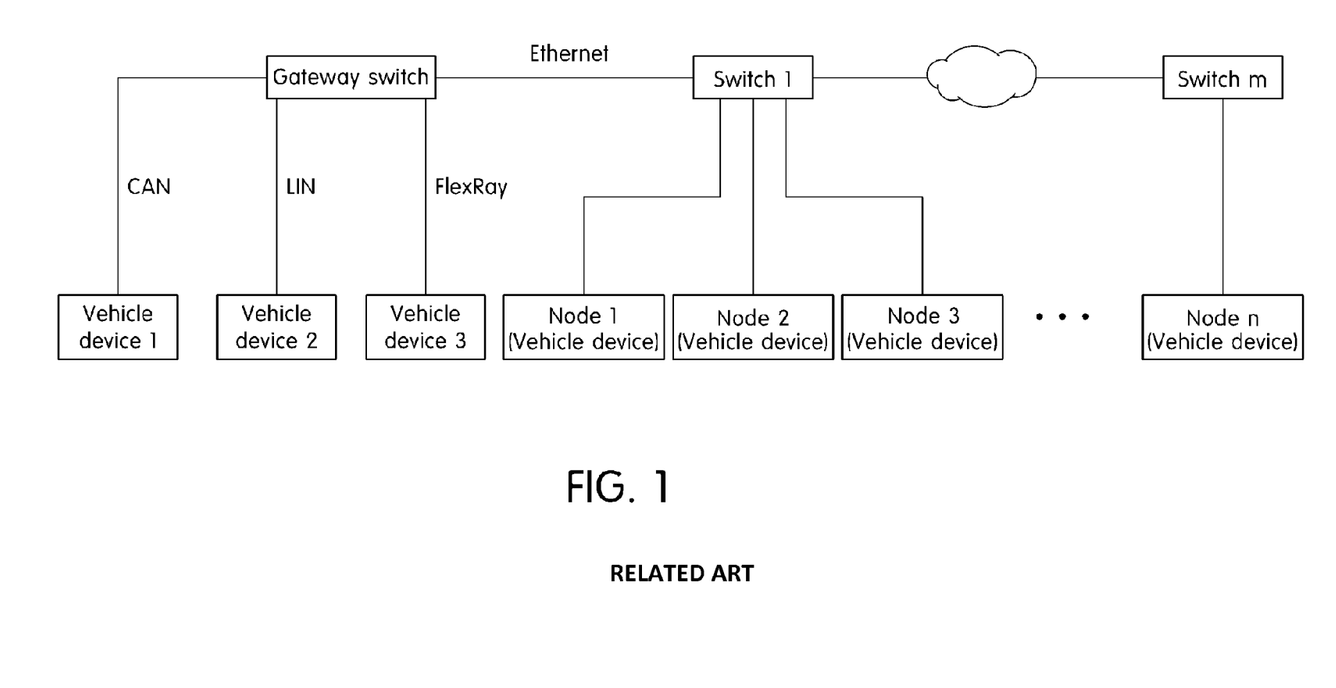
FIG. 1 is an exemplary diagram of a vehicle network system in which an Ethernet AVB is connected to an existing vehicle network and a gateway switch according to the related art.
Figure 2:
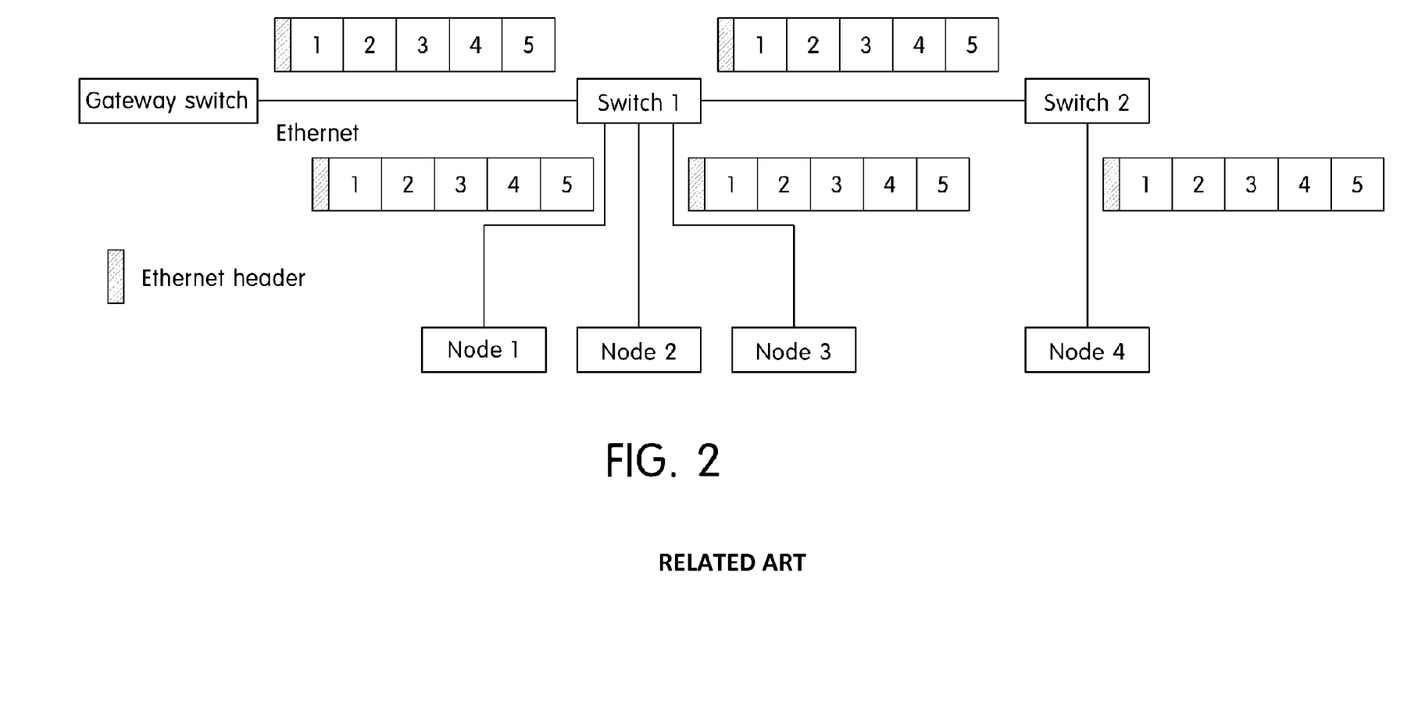
FIG. 2 is an exemplary view illustrating a message frame format of the Ethernet AVB and a transmission/reception method according to the related art.

FIG. 1 is an exemplary diagram of a vehicle network system in which an Ethernet AVB is connected to an existing vehicle network and a gateway switch, and FIG. 2 is an exemplary view illustrating a message frame format of the Ethernet AVB and a transmission/reception method.

As shown in FIG. 1, the Ethernet AVB is connected to a vehicle network such as CAN, LIN, or FlexRay via a gateway switch and a plurality of messages whose data sizes are substantially small may be integrated in one Ethernet message to be transmitted. Further, destination nodes of vehicle network messages (containing information transmitted from devices) contained in the Ethernet message are different, the Ethernet message should be transmitted to a plurality of nodes (e.g., the devices of the vehicle which transmit and receive the messages) and the nodes that have received the message should extract messages required by the nodes from the plurality of vehicle network messages to use the extracted messages.

Related standards for transmitting vehicle network messages to an Ethernet AVB in a vehicle network such as CAN, LIN, and FlexRay are defined in IEEE 1722a. In other words, a frame format for CAN messages in a draft version of IEEE 1722a includes an AVB header and a plurality of CAN messages, and then, each of the messages include a timestamp value that represents a time point when the message is received in unit of ns. Further, all nodes in the Ethernet AVB are time synchronized according to IEEE 802.AS, and the gateway switch of FIG. 1 may receive a message from LIN, CAN, and FlexRay, and then may transmit a plurality of messages while the plurality of messages are contained in one Ethernet AVB frame as shown in FIG. 2. In particular, since the Ethernet has an overhead for a header, it is efficient to transmit data while maximizing the size of the data.

When a plurality of CAN messages, which are to be transmitted to node 1 and node 2 of FIG. 1, are included in one Ethernet AVB frame according to the related art, the same Ethernet AVB message should be transmitted to all nodes. Thus, since node 1 receives unnecessary information of node 2, a bandwidth of the network is wasted and the nodes that received the unnecessary information generate an overhead of extracting information required by the nodes in the Ethernet AVB message.

Moreover, when a destination of one Ethernet AVB frame includes only one message which is a specific node, a plurality of small Ethernet AVB frames should be transmitted, causing an overhead. Further, the Ethernet of a vehicle should be used in conjunction with existing representative vehicle networks such as LIN, CAN, and FlexRay. In particular, a gateway switch related technology of using a gateway switch shown in FIGS. 1 and 2, and transmitting one Ethernet message while one or more vehicle network messages such as a CAN message whose frame size is substantially small are included in the Ethernet message has been suggested. Further, a frame format by which a vehicle network message transmitted via CAN, LIN, and FlexRay may be included in the Ethernet message of a vehicle is opened in an IEEE 1722a draft version.

Hereinafter, a vehicle network message in the specification refers to a message transmitted by devices connected to vehicle networks such as LIN, CAN, and FlexRay, and nodes (node 1 to node n) connected to an Ethernet switch. In particular, the devices connected to LIN, CAN, and FlexRay and the nodes connected to the Ethernet switch may be controllers in the vehicle which communicate with each other. The vehicle network messages include information to be transmitted and received between the controllers, and include information (e.g., addresses or identification symbols and the like) of dispatch locations and destinations of the messages. Currently, the Ethernet switch technology has been developed in Internet technologies and industrial network technologies, and since only the Ethernet has been considered in the industrial field, the Ethernet switch generally transfers a corresponding message to a destination port based on a MAC address.

As shown in FIG. 2, five vehicle network messages are included in one Ethernet message, and when messages 1 and 3 are to be transferred to node 1, message 2 is transferred to node 3, and messages 4 and 5 are transferred to node 4. However, the existing switch technology does not consider any internal vehicle network messages. Thus, all the Ethernet messages are copied to the nodes to be transferred in the same way. Accordingly, an overhead is generated in the entire network, and the node that received the message analyzes all the Ethernet messages to extract and use messages required by the node.

For example, the Ethernet switch according to the related art switches all the Ethernet frames based on Ethernet MAC addresses, and when the Ethernet is utilized in a vehicle, it needs to be operated in conjunction with the existing vehicle networks such as CAN, LIN, and FlexRay. In particular, an Ethernet message may be transmitted while a plurality of network messages are included in the Ethernet message, and the Ethernet switch performs switching based on a MAC address, a plurality of vehicle network messages to be transmitted only to specific nodes, respectively, should be included in one Ethernet message. In this way, when a plurality of vehicle network messages to be transmitted to nodes of various MAC addresses are included in one Ethernet message, the same message is copied to a plurality of nodes. Accordingly, a bandwidth of a network is wasted and necessary data needs be extracted from all Ethernet messages in each node, generating an overhead.

SUMMARY

The present invention provides a method and system which may transmit a plurality of vehicle network messages transmitted from vehicle networks such as CAN, LIN, and FlexRay by a gateway switch (e.g., an edge router) while the vehicle network messages are included in one Ethernet message, and may transmit and receive messages more efficiently while preventing the same Ethernet message from being copied by an Ethernet switch to be switched to a plurality of nodes, that is, wasting bandwidth and generating an overhead.

In accordance with an aspect of the present invention, an Ethernet based vehicle network message transferring method of transferring messages between vehicle devices via the Ethernet and vehicle networks having different protocols in a vehicle network system in which the vehicle networks and the Ethernet are connected via a gateway switch, may include: receiving individual messages whose destinations are different from vehicle devices via the vehicle networks, by the gateway switch; transmitting the received individual messages to an Ethernet switch while one Ethernet message contains the received individual messages, by the gateway switch; analyzing the received Ethernet message and identifying destinations of the individual messages contained in the Ethernet message, by the Ethernet switch; and dividing the Ethernet message containing information of the individual messages according to destinations and transmitting the divided Ethernet messages to the corresponding destinations, by the Ethernet switch.

The Ethernet based vehicle network message transferring method may further include: transmitting the Ethernet message by the vehicle devices connected to the Ethernet switch, and receiving the Ethernet message by the Ethernet switch; and integrating the Ethernet messages received from the vehicle devices into one Ethernet message and transmitting the integrated Ethernet message to the gateway switch, by the Ethernet switch.

In accordance with another aspect of the present invention, an Ethernet based vehicle network message transferring system may include: a gateway switch that connects the Ethernet to vehicle networks that have different protocols; and an Ethernet switch that switches Ethernet messages between the gateway switch and vehicle devices to transfer the Ethernet messages, wherein the Ethernet switch may include: a processing module that transfers the Ethernet messages received via the gateway switch in the different vehicle networks; a vehicle network process module that switches the messages transferred from the processing module; and a lookup table in which information necessary for switching the vehicle network process module is stored, and wherein the vehicle network process module may be configured to analyze an Ethernet message transferred via the processing module in the gateway switch to identify destinations of individual messages in the Ethernet message, and divide the Ethernet message that includes information regarding the individual message according to destinations to transmit the divided Ethernet messages to vehicle devices of destinations.

According to the present invention, by applying a method of dividing a message received from a gateway switch and transferring the divided messages to corresponding destinations by an Ethernet switch, bandwidth waste and overhead problems of a conventional method in which the same Ethernet message is copied to be switched to a plurality of nodes by an Ethernet switch may be solved and thus messages may be transmitted and received more efficiently.

BRIEF DESCRIPTION OF THE DRAWINGS

The above and other features of the present invention will now be described in detail with reference to exemplary embodiments thereof illustrated the accompanying drawings which are given hereinafter by way of illustration only, and thus are not limitative of the present invention, and wherein.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Additionally, it is understood that the term switch (e.g., router) refers to a hardware device that includes a memory, network adaptor, and a processor. The memory is configured to store the modules and the processor is specifically configured to execute said modules to perform one or more processes which are described further below. The network adapter is configured to send and receive data to and from other devices in the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that those skilled in the art can easily carry out the present invention.

Figure 3:
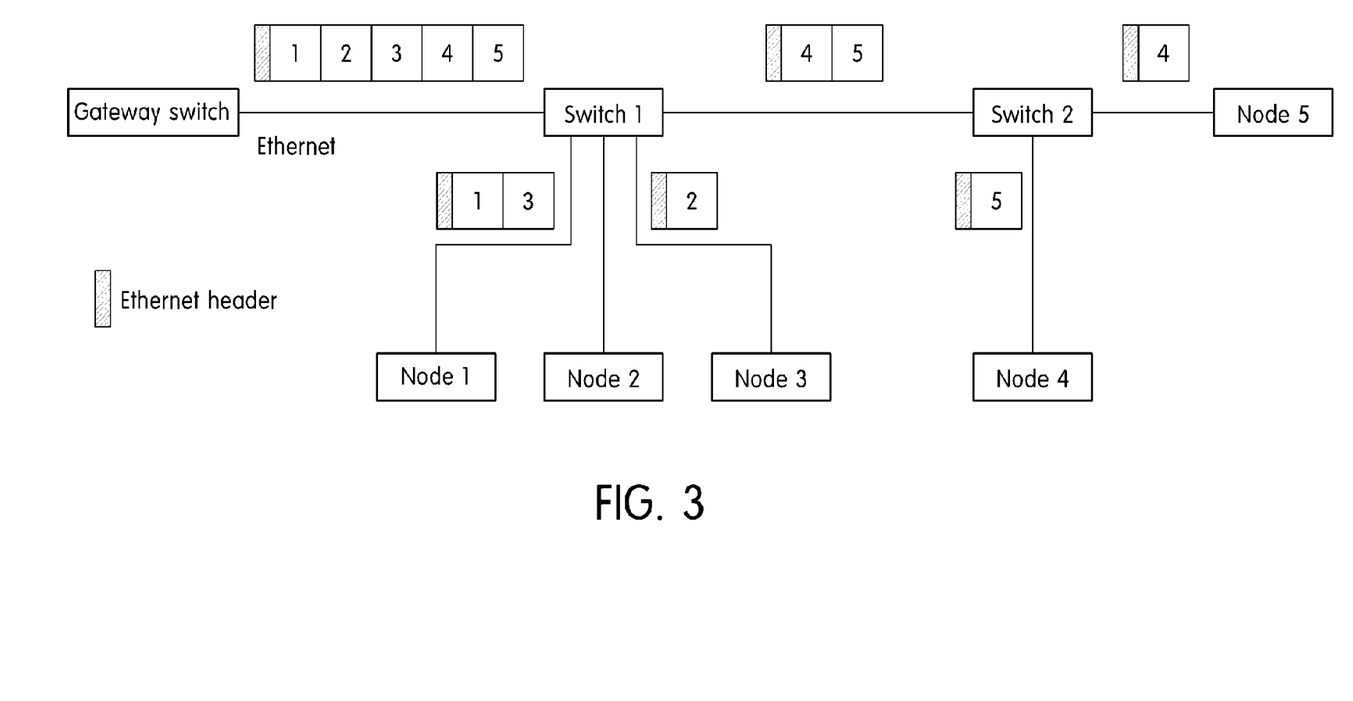
FIGS. 3 and 4 are exemplary diagrams of a system according to an exemplary embodiment of the present invention.
Figure 4:
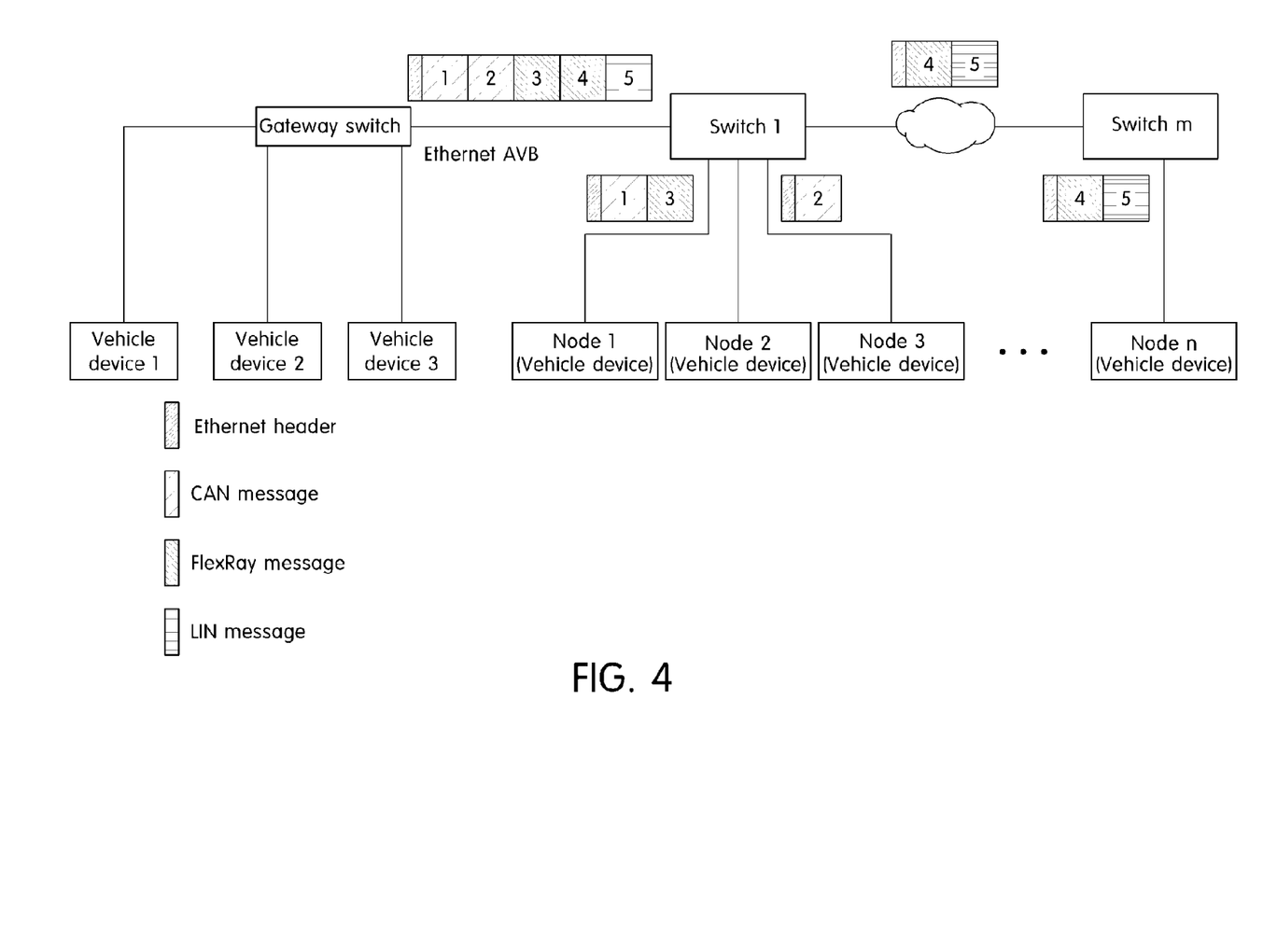

FIGS. 3 and 4 are exemplary diagrams of a system according to an exemplary embodiment of the present invention, and show that vehicle networks such as CAN, LIN, and FlexRay are connected to an Ethernet AVB via a gateway switch. As shown, a plurality of vehicle devices may be connected to vehicle networks such as CAN, LIN, and FlexRay to transmit and receive messages including various information (e.g., information needed by other devices). Further, the Ethernet AVB may be connected to a plurality of vehicle networks such as CAN, LIN, and FlexRay via a gateway switch to communicate with the vehicle networks to use the Ethernet in conjunction with the vehicle networks.

The gateway switch is a constituent element that connects a plurality of different networks, that is, networks such as CAN, LIN, and FlexRay to the Ethernet, and receives a plurality of vehicle network messages whose destinations are different via networks such as CAN, LIN, and FlexRay, and contains the plurality of received messages whose destinations are different in one Ethernet frame to transmit the Ethernet frame to an Ethernet switch. The Ethernet switch connected to the gateway switch may be connected to the vehicle devices that is, one or more of nodes 1 to 5 and node n, which transmit and receive messages, to communicate with the devices.

Additionally, the gateway switch and the nodes may be connected to designated communication ports of the Ethernet switch (hereinafter, referred to as 'switch 1'), and switch 1 may be connected to another Ethernet switch (hereinafter, referred to as 'switch 2') via a separate designated communication port to transmit and receive a message. In particular, switch 2 may also be connected to the one or more of nodes, which transmit and receive messages, via designated communication ports to communicate with the nodes.

In the present invention, the one or more of devices connected to the vehicle network such as CAN, LIN, and FlexRay and the nodes connected to the switches may be vehicle devices which communicate with each other, for example, controllers of the vehicle electronic system.

Moreover, in a message transferring process, after receiving vehicle network messages from the vehicle networks such as CAN, LIN, and FlexRay, the gateway switch may be configured to transmit one Ethernet message while a plurality of vehicle network messages are included in the Ethernet message. Subsequently, when an Ethernet message is received from the gateway switch, the Ethernet message may be divided based on destination paths of the vehicle network messages with reference to a header of the received Ethernet message and addresses (or identification symbols) designated to the vehicle network messages. In addition, after the Ethernet messages divided for the vehicle network messages are created, the divided Ethernet messages may be transmitted to corresponding destination nodes via the designated communication ports.

Further, the Ethernet message divided in switch 1 may be transmitted to switch 2 via the designated communication port, and the transmitted Ethernet message may be transferred to one destination node without being divided (see FIG. 4), or when a plurality of final destination nodes are in switch 2, the Ethernet message may be divided again based on the address designated in the message and the divided Ethernet messages may be transmitted to final destination nodes via the designated communication ports (see FIG. 3). For example, after receiving the Ethernet message transmitted from the gateway switch and analyzing the Ethernet message and the individual vehicle network messages, switch 1 may be configured to transmit Ethernet messages for destinations of the vehicle network messages. Additionally, when the nodes transmit the vehicle network messages, which will be transmitted to CAN, LIN, and FlexRay, the switches may be configured to integrate and then transmit the integrated Ethernet messages to the gateway switch via the designated communication ports.

Figure 5:
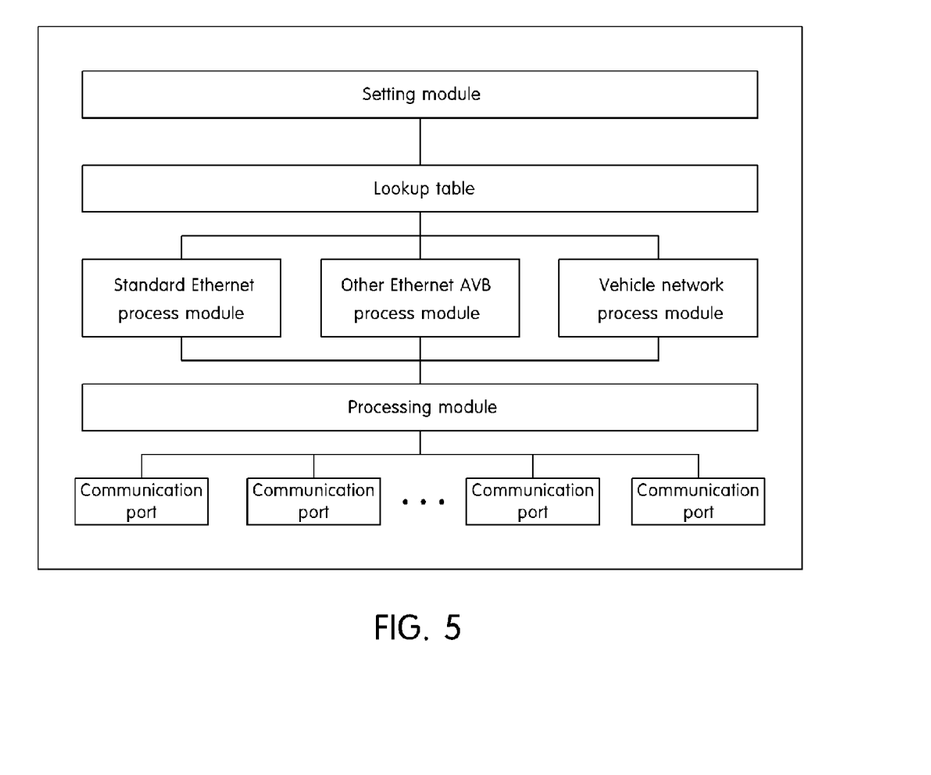
FIG. 5 is an exemplary block diagram showing a configuration of a switch in the system according to the exemplary embodiment of the present invention.

FIG. 5 is an exemplary block diagram showing a configuration of a switch in the system according to the exemplary embodiment of the present invention. The switch may include: a processing module (e.g., a processor) configured to transmit analyzing information regarding communication ports through which the Ethernet message may be received and the received Ethernet message to transfer the analyzed Ethernet message to the process modules or transferring the messages transferred from the process modules to the corresponding communication ports; a standard Ethernet process module and other Ethernet process modules configured to switch the standard Ethernet or other Ethernet messages; a vehicle network process module configured to switch the vehicle network message transferred via the gateway switch from the vehicle networks such as CAN, LIN, and FlexRay; a lookup table configured to store information necessary for switching of the process modules; and a setting module configured to change a function of the switch and information of the lookup table.

Figure 6:
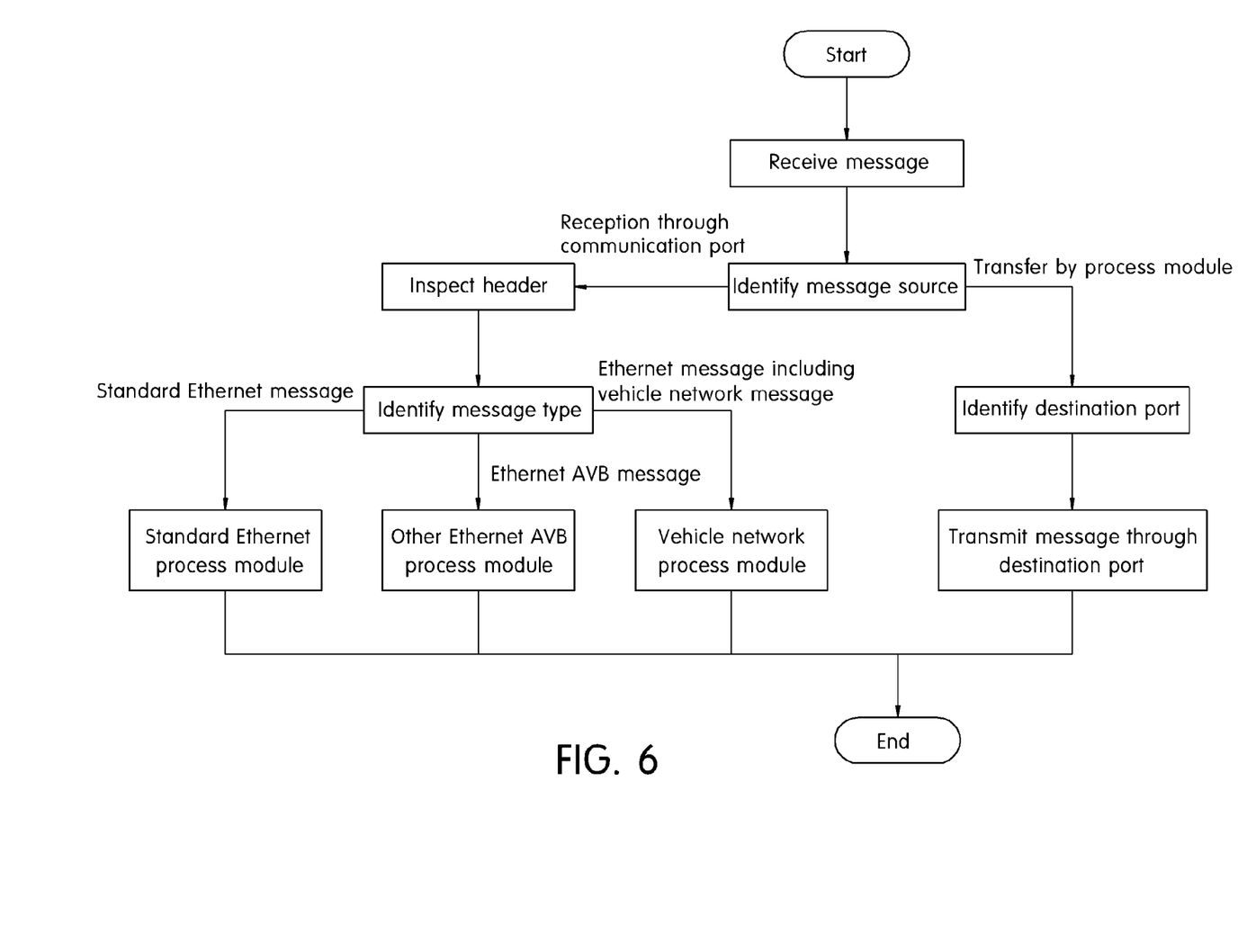
FIGS. 6 to 9 are exemplary flowcharts showing a message transmission/reception method according to an exemplary embodiment of the present invention.
Figure 7:
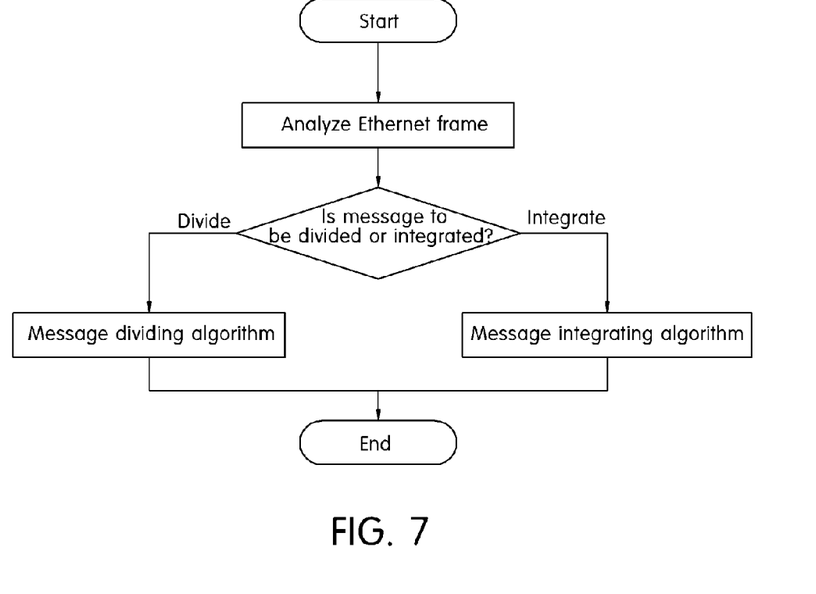

FIGS. 6 to 9 are exemplary flowcharts showing a message transmission/reception method according to an exemplary embodiment of the present invention. FIG. 6 shows an exemplary algorithm performed by the processing module of the switch to efficiently transmit and receive the vehicle network message, and FIG. 7 shows an exemplary algorithm performed by the vehicle network process module.

First, as shown in FIG. 6, when switch 1 receives a message via a communication port, the processing module of switch 1 may be configured to identify a communication port that has received the message and a location (e.g., a reception point (message source) that has transferred the corresponding message) where the message is transmitted. When the processing module receives a message from the process module, that is, when the received message is a message transmitted from the process module, a target port (e.g., a communication port that corresponds to a destination) may be identified and a message may be transmitted via the identified target port.

Further, the Ethernet message transferred from the process module may be a message transferred from a standard Ethernet process module, other Ethernet AVB process modules, and a vehicle network process module. Particularly, the message transferred from the vehicle network process module may be an Ethernet message integrated by a message integrating algorithm, which will be described later, and the Ethernet message integrated by the vehicle network process module may be transmitted to the gateway switch via a communication port and may be transferred to a final destination as in the related art.

In response to identifying that the received message is an Ethernet message received from the outside of a switch via a communication port, the processing module may be configured to analyze a header of the Ethernet message to identify a type of the message. In particular, when the received Ethernet message is the standard Ethernet message or the other Ethernet AVB messages, the message may be transferred to the standard Ethernet process module and the other Ethernet AVB process modules.

Further, when the received Ethernet message is a message received from vehicle networks such as CAN, LIN, and FlexRay via the gateway switch, that is, an Ethernet message including the vehicle network message, the received Ethernet message may be transferred to the vehicle network process module. In particular, the vehicle network message may be a message that includes information which the vehicle devices are to transmit via networks such as CAN, LIN, and FlexRay, and as described above, the messages received from a plurality of vehicle devices by the gateway switch may be included in one Ethernet message to be transmitted to switch 1.

Moreover, the vehicle network process module of the switch may be configured to receive the Ethernet message transmitted from the gateway switch via the communication port and the processing module, Ethernet messages including information to be transmitted to the vehicle devices via the gateway switch may be received from the nodes via communication ports designated for the nodes. The Ethernet message transferred through the processing module may become a plurality of messages that include information sent by the vehicle devices via the network such as CAN, LIN, and FlexRay, that is, messages that include a plurality of vehicle network messages. Since the Ethernet message transferred via the processing module may be a message that includes messages to be transferred to destination nodes, the Ethernet message may be divided into individual messages to be transmitted to the destination nodes.

Furthermore, the Ethernet messages received from the nodes may be messages to be integrated into one Ethernet message for external transmission by the vehicle network process module. Accordingly, as shown in FIG. 7, the vehicle network process module may be configured to determine whether the Ethernet message is to be divided or integrated by analyzing a frame of the Ethernet message transferred from the processing module, and then calling the corresponding algorithm for division or integration of a message.

When the Ethernet message transferred to the vehicle network process module corresponds to messages received from the nodes, the messages received from the nodes may be integrated into one Ethernet message and a message integrating algorithm transmitted to the processing module may be called. Additionally, when the Ethernet message transferred to the vehicle network process module is an Ethernet message transmitted from the gateway switch via the communication port and the processing module, that is, an Ethernet message that includes a plurality of vehicle network messages (e.g., messages transmitted from the vehicle devices via CAN, LIN, FlexRay and the like), the Ethernet message may be divided and then a message dividing algorithm divides the Ethernet message and transmits the divided vehicle network messages to the corresponding destination nodes.

Figure 8:
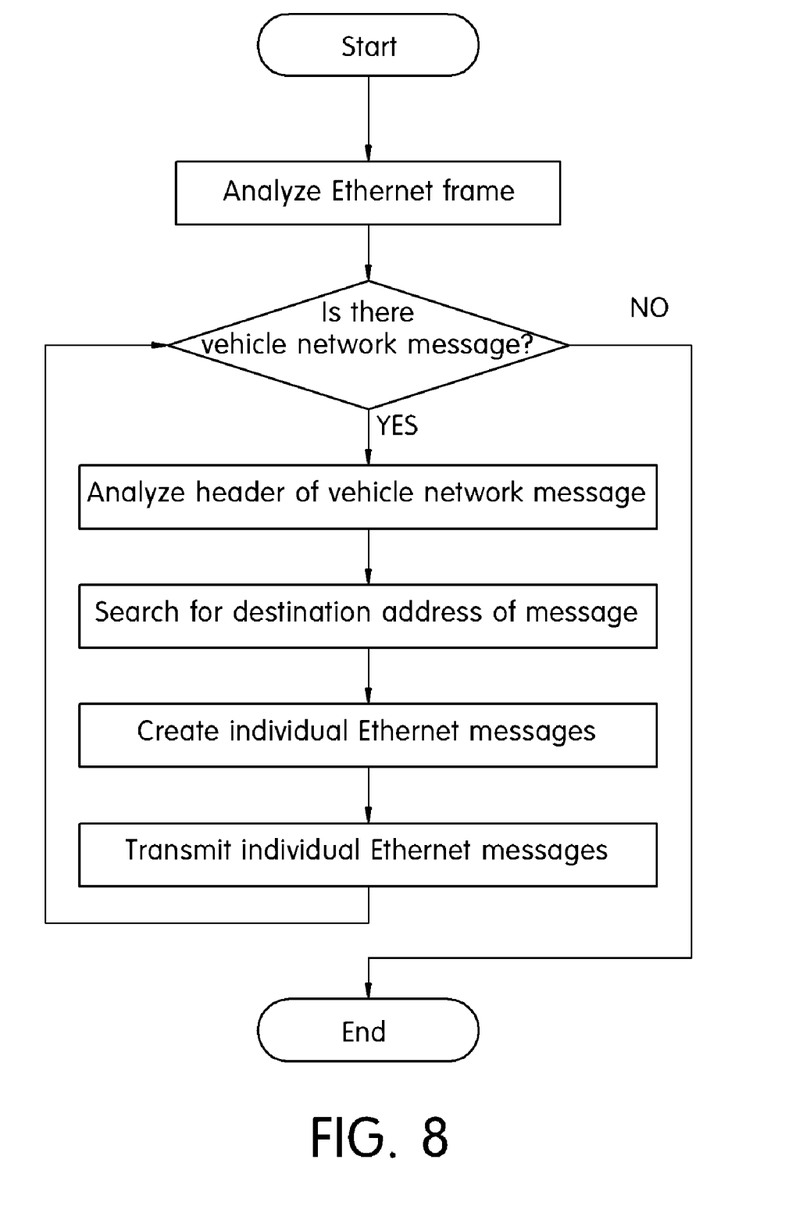
Figure 9:
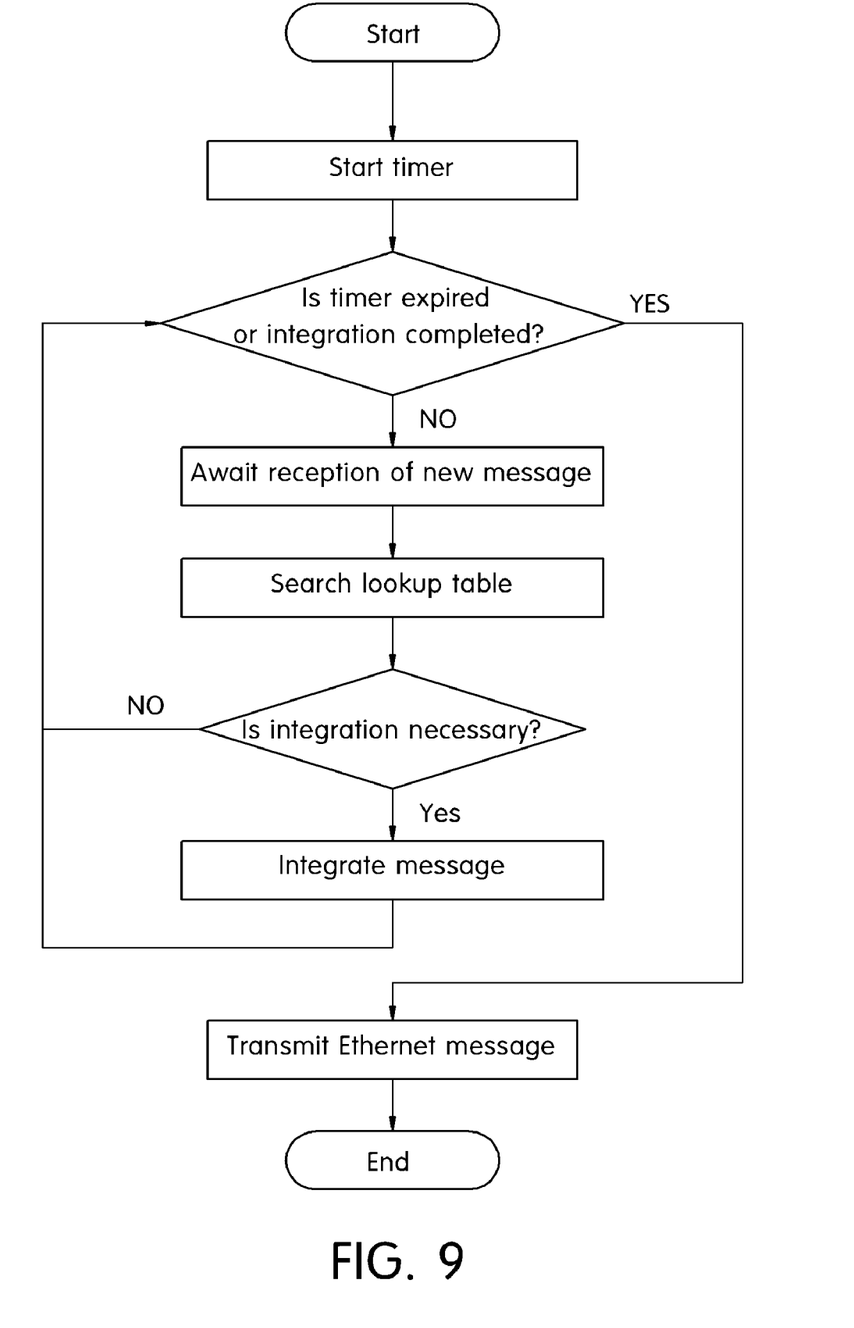

FIGS. 8 and 9 are exemplary flowcharts showing processes of a message dividing algorithm and a message integrating algorithm performed by the vehicle network process module. First, the division algorithm as in FIG. 8 may be called to switch an Ethernet message to be divided, and the division algorithm may classify the individual vehicle network messages included in the Ethernet message by analyzing the frames.

Subsequently, headers of the vehicle network messages may be analyzed to identify destination addresses of the messages while the vehicle network messages are sequentially read. Then, after an identification symbol and a length of a header are read from the header of the vehicle network message, a lookup table may be searched to determine a destination. Further, individual Ethernet messages (e.g., Ethernet messages that include information regarding the vehicle network messages) for the vehicle network messages may be created based on the lookup table. The created Ethernet messages may be transmitted to destination nodes via communication ports, and the processes may be repeatedly performed for all the vehicle network messages included in the Ethernet message.

Furthermore, a message integrating algorithm may be called from the vehicle network process module to process messages to be integrated, and the message integrating algorithm may receive vehicle network messages to be transmitted to the gateway switch from the nodes, that is, Ethernet messages of the nodes and integrate the vehicle network messages into one Ethernet message to transmit the integrated Ethernet message.

As shown in FIG. 9, when a time set by a timer elapses or a predetermined number of messages are completely integrated, the message integrating algorithm may transmit the integrated Ethernet message via a communication port. When a new message that includes new information is received from a node via a communication port until a timer is expired or integration is completed and is stood by, the message integrating algorithm may identify whether the received new message is a message which needs to be integrated by searching a lookup table for the message frame information, and the corresponding new message may be added and integrated to an end of the Ethernet message to be transmitted when the message is a message to be integrated. The finally integrated Ethernet message may be transmitted to the gateway switch via a communication port after being transferred from the vehicle network process module to the processing module.

The header of an Ethernet message integrated by the message integrating algorithm may include information (e.g., addresses and identification symbols) regarding a dispatch point and a destination for messages of nodes. The Ethernet message (e.g., vehicle network messages to be sent to the nodes) divided by the message dividing algorithm may also include a dispatch point and a destination in the Ethernet header.

Although the exemplary embodiments of the present invention have been described in detail, the scope of the present invention are not limited to the embodiments and various modifications and improvements made by those skilled in the art by using the basic concept of the present invention also fall within the scope of the present invention.

What is claimed is:

1. A vehicle network message transferring method, comprising:
   receiving individual messages whose destinations are different from vehicle devices via vehicle networks, by a gateway switch;
   transmitting the received individual messages to an switch while one message contains the received individual messages, by the gateway switch;
   analyzing the received message and identifying destinations of the individual messages contained in the message, by the switch;
   dividing the message containing information of the individual messages based on destinations and transmitting the divided messages to the corresponding destinations, by the switch;
   transmitting the message by the vehicle devices connected to the switch, and receiving the message by the switch; and
   integrating the messages received from the vehicle devices into one message and transmitting the integrated message to the gateway switch, the switch,
   integrating the messages received from the vehicle devices into one message and transmitting the integrated message to the gateway switch, by the switch,
   wherein the switch analyzes a frame of the received message to determine whether to divide or integrate the message, and calls one of a message dividing algorithm and a message integrating algorithm to divide or integrate the message based on the algorithm.

2. The vehicle network message transferring method of claim 1, further comprising in the message integrating algorithm:
   searching a lookup table from the frame information of the received message to determine whether to integrate the message;
   and in response to determining that the message is to be integrated, adding and integrating the message with one message to be transmitted to the gateway switch.

3. The vehicle network message transferring method of claim 1, further comprising in the message integrating algorithm:
   repeating receiving another new message, determining to integrate a new message, and integrating the new message until lapse of a set time or a predetermined number of messages are integrated; and
   transmitting the integrated message to the gateway switch.

4. The vehicle network message transferring method of claim 1, further comprising:
   analyzing, by the switch, a frame of the message received from the gateway switch in the division process to classify the individual messages included in the message;
   analyzing, by the switch, headers of the individual messages to identify destination addresses of the individual messages; and
   dividing, by the switch, the message that includes information regarding the individual messages according to destinations.

5. The vehicle network message transferring method of claim 4, further comprising:
   reading, by the switch, identification symbols (ID) and header lengths of the individual messages from the individual messages; and
   searching, by the switch, a lookup table to identify destination addresses.

6. The vehicle network message transferring method of claim 1, wherein the different vehicle networks comprise at least one of CAN (Controller Area Network), LIN (Local Interconnect Network), and FlexRay.

7. An vehicle network message transferring system, comprising:
   a switch configured to switch messages between a gateway switch and vehicle devices to transfer the messages,
   wherein the switch includes:
      a processing module configured to transfer the messages received via the gateway switch in the different vehicle networks;
      a vehicle network process module configured to:
         switch the messages transferred from the processing module;
         analyze a message transferred via the processing module in the gateway switch to identify destinations of individual messages in the message; and
         divide the message that includes information regarding the individual message according to destinations to transmit the divided messages to vehicle devices of destinations; and
      a lookup table in which information necessary for switching the vehicle network process module is stored,
   wherein when the vehicle network process module receives messages from vehicle devices connected to the switch, the vehicle network process module is configured to integrate the messages into one message and transmit the integrated message to the gateway switch, and wherein the vehicle network process module is further configured to:
- analyze a frame of the received message to determine whether to divide or integrate the message; and
- call one of a message dividing algorithm and a message integrating algorithm to perform a division or integration process according to the algorithm.

8. The vehicle network message transferring system of claim 7, wherein in the message integrating algorithm, the lookup table is searched from frame information of the received message to identify that the message is to be integrated, and when the message is a message to be integrated, the message is added to one message to be transmitted to the gateway switch.

9. The vehicle network message transferring system of claim 7, wherein in the message integrating algorithm, processes of receiving another new message, determining to integrate a new message, and integrating the new message are repeated until lapse of a set time or a predetermined number of messages are integrated, and the integrated message is transmitted to the gateway switch.

10. The vehicle network message transferring system of claim 7, wherein the vehicle network process module is configured to:
- analyze a frame of the message received from the gateway switch in the division process to classify the individual messages included in the message;
- analyze headers of the individual messages to identify destination addresses of the individual messages; and
- divide the message that include information regarding the individual messages according to destinations.

11. The vehicle network message transferring system of claim 10, wherein the vehicle network process module is configured to:
- read identification symbols (ID) and header lengths of the individual messages from the individual messages; and
- search the lookup table to identify destination addresses.

12. The vehicle network message transferring system of claim 7, wherein the different vehicle networks comprise at least one of CAN (Controller Area Network), LIN (Local Interconnect Network), and FlexRay.

13. A vehicle network message transferring method, comprising:
- analyzing, by a switch, a message that contains individual messages received from a gateway switch via vehicle networks;
- identifying, by the switch, destinations of the individual messages contained in the message;
- dividing, by the switch, the message containing information of the individual messages based on destinations;
- transmitting, by the switch, the divided messages to the corresponding destinations;
- receiving, by the switch, the message that is transmitted by vehicle devices connected to the switch;
- integrating, by the switch, the messages received from the vehicle devices into one message; and
- transmitting, by the switch, the integrated message to the gateway switch;
- wherein the switch analyzes a frame of the received message to determine whether to divide or integrate the message, and calls one of a message dividing algorithm and a message integrating algorithm to divide or integrate the message based on the algorithm.

* * * * *